Patented Dec. 23, 1952

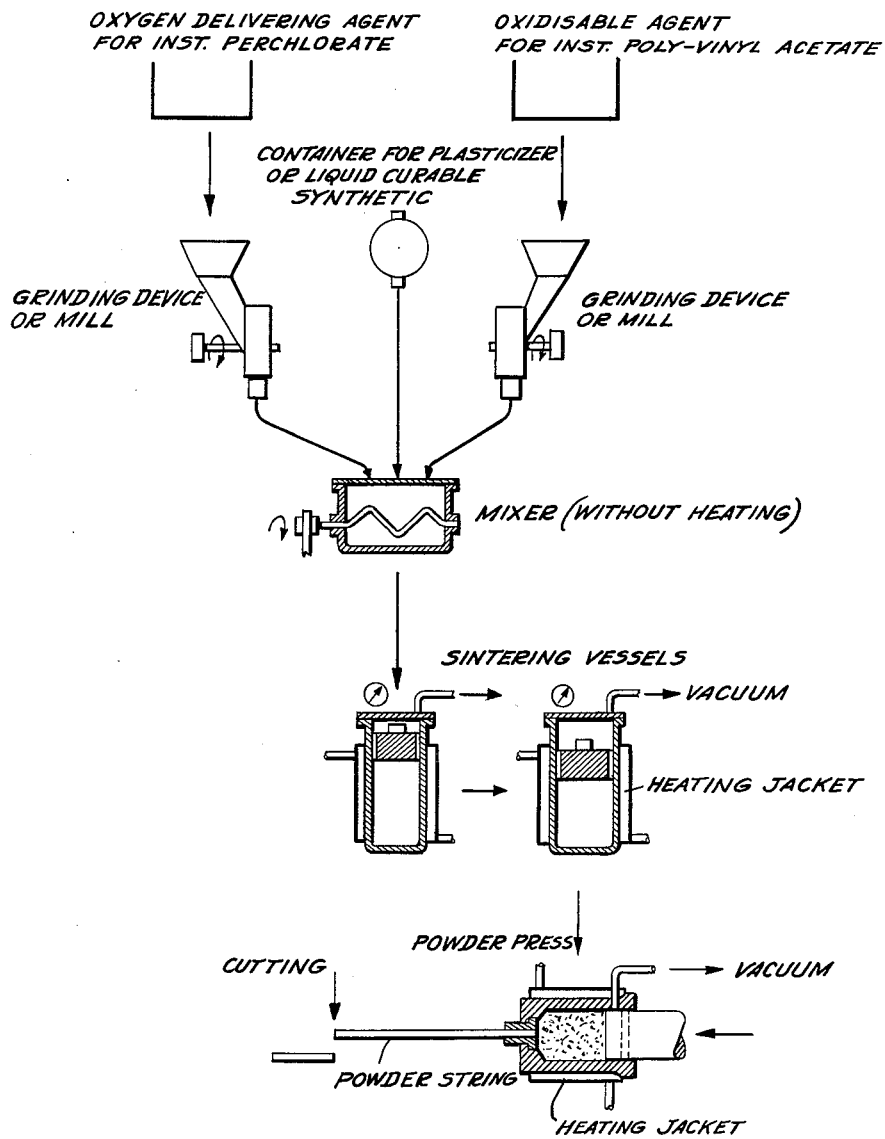

2,622,277

UNITED STATES PATENT OFFICE 2,622,277

METHOD FOR PRODUCING ROCKET POWDER

Frans Tore Baltzar Bonell and Rolf Juhlin, Akers Styckerbruk, Sweden

Application August 28, 1948, Serial No. 46,706
In Sweden September 29, 1947

3 Claims. (Cl. 18—47.5)

This invention relates to a method of producing a rocket propellant.

In producing rocket propellant in string form consisting of a mixture of a thermoplastic substance and a finely divided oxygen delivering substance, such as picric acid, nitrates, perchlorates, etc. it has been heretofore common to perform the mixing operation by means of heated rollers. This operation can be very dangerous. Generally the mixing operation is effected at high temperature (80–100° C.) and any accompanying extraneous objects or high compression by the rollers may cause ignition or explosion. This procedure is, however, also impaired by other inconveniences. Because of the high temperature and the hard mechanical working, especially in the presence of oxygen delivering substances, there will be considerable decomposition of the thermoplastics so that the resistance properties of the powder as well as its keeping qualities in storage are reduced. Yet such hard working has been considered necessary to provide the desired intimate mixture of the oxygen delivering substance and the organic material, such intimate mixture being required to obtain uniform burning without danger of explosion.

Thus it might be surprising that a product having considerably improved properties may be obtained in a simplified manner and with much less danger of explosion, if any. The invention consists in an improved method of producing rocket powder characterized in that the active component, i. e. an oxygen delivering substance such as nitrate, perchlorate, etc. or an explosive such as picric acid, trotyl, hexogen, etc., is finely divided and mixed with thermoplastic or liquid curable organic material which also is finely divided whereupon the mixture is sintered by the application of heat and pressure and then formed into portions having any desired cross section.

The drawing illustrates schematically the steps of the process.

In the following specification the principal idea of the invention is first described and thereafter some modifications are indicated as examples and not as limitations on the scope of the accompanying claims.

The components forming the powder mass are first subjected to separate disintegrating operations. Thus the active component, such as ammonium nitrate, ammonium perchlorate, potassium perchlorate, trotyl, hexogen, pentyl, picric acid etc. is ground or milled separately. In the case of solid explosives, i. e. trotyl, hexogen etc., the grinding is preferably performed in water and then the product is dried. Instead of grinding the disintegrating may be performed by precipitation from solutions, e. g. a solution of trotyl in acetone may be precipitated by water. Disintegration may also be obtained by atomization as by spraying molten substances onto a rotating disc etc. After disintegration, it is preferable to screen the material to obtain a uniform grain size.

In a similar way disintegration of the thermoplastic substance is effected; such substances as polyvinyl acetate, polyvinyl acetal, acrylate, polystyrene, cellulose esters, mixtures of rubber and synthetic resins, casein, bitumen, asphalt pitch, resin etc. If more than one of these thermoplastic substances is to be included in the finished product it is preferable to disintegrate each substance separately. Disintegration by grinding in a disc mill accompanied by cooling is preferred. Sometimes the crushing may be improved by the addition of small amounts of carbon black, meal etc. After the disintegration, the components are mixed in a mixing drum, mixer or the like. Simultaneously, or after mixing the primary ingredients, there may be added further components of a different type, such as radiation covering agents (carbon black, pigments), stabilizing agents, softening agents (phthalates).

After mixing, the mass is placed in a sintering vessel or mold and it is heated and mechanical pressure is applied to said mass until it is sintered into cylinder form. To avoid encased air in the powder mass sintering is performed under vacuum conditions. Also the mass is subjected to mechanical pressure only after it has been heated in the sintering vessel and the air has escaped.

The powder body or cylinder thus obtained is then placed in a powder press provided with a heater. Before such placing it may be advantageous to pre-heat the body to the correct temperature as the pressing operation is highly dependent on the temperature of the body.

The powder is then extruded, preferably under vacuum, into the shape of bars, tubes, multiperforated powder etc.

Instead of sintering the powder mass prior to extrusion it may be compressed into small briquettes, for example, in a tablet machine, with or without heat, but preferably under vacuum. The powder press is then charged with these briquettes or tablets and the powder is extruded under vacuum.

According to another modification of the invention curable resins are added on mixing of the powder mass. The properties of the resins must be adapted to the sintering temperature and pressure in order to obtain final curing after the extruding operation, which is accompanied by heat, is completed. Such resins may be either in their liquid or solid state and comprise, for example, resins based on urea or phenolformaldehyde.

According to a further modification of the invention the powder may be produced by extruding the sintered mixture without pre-heating or adding any additives. However, it is preferred to preheat the sintered mixture or to use additions, such as oil, diamyl phthalate or the like. It is also preferable to carry out the method under vacuum conditions. Otherwise, a porous powder having a high rate of burning will be obtained.

We claim:

1. In a method of producing a rocket propellant in string form, the steps comprising pulverizing an active component and a thermoplastic component separately, mixing said components, placing the mixture in a mold, sintering the mixture in said mold by the application of heat and pressure under vacuum conditions and forming such sintered material into strings by passing same through a string press.

2. In a method of producing a rocket propellant in string form, the steps comprising pulverizing active and thermoplastic components separately, mixing said components, placing the mixture in a mold having substantially the same diameter as a cylinder of a string press, sintering the mixture in said mold by the application of heat and pressure under vacuum conditions and forming such sintered material into strings by passing same through the string press.

3. In a method of producing rocket propellant in string form, the steps comprising pulverizing an active component and a thermoplastic component separately, mixing such pulverized components, placing the mixture in a mold, heating the mixture in a vacuum to a temperature below the melting point of the thermoplastic material while simultaneously applying a constant pressure upon such mixture, and forming the heated mixture into strings by passing same through a string press.

FRANS TORE BALTZAR BONELL.
ROLF JUHLIN.

REFERENCES CITED

The following references are of record in the file of this patent:

UNITED STATES PATENTS

| Number | Name | Date |
|---|---|---|
| 538,618 | Maxim | Apr. 30, 1895 |
| 1,765,804 | Preston | June 24, 1930 |
| 1,837,770 | Gilbert | Dec. 22, 1931 |
| 1,894,368 | Growley | Jan. 17, 1933 |
| 2,371,868 | Berg et al. | Mar. 20, 1945 |
| 2,383,989 | Pilcher | Sept. 4, 1945 |
| 2,417,090 | Silk et al. | Mar. 11, 1947 |
| 2,446,062 | Rentschler et al. | July 27, 1948 |
| 2,479,727 | Daniels | Aug. 23, 1949 |
| 2,495,823 | Rice | Jan. 31, 1950 |